United States Patent Office.

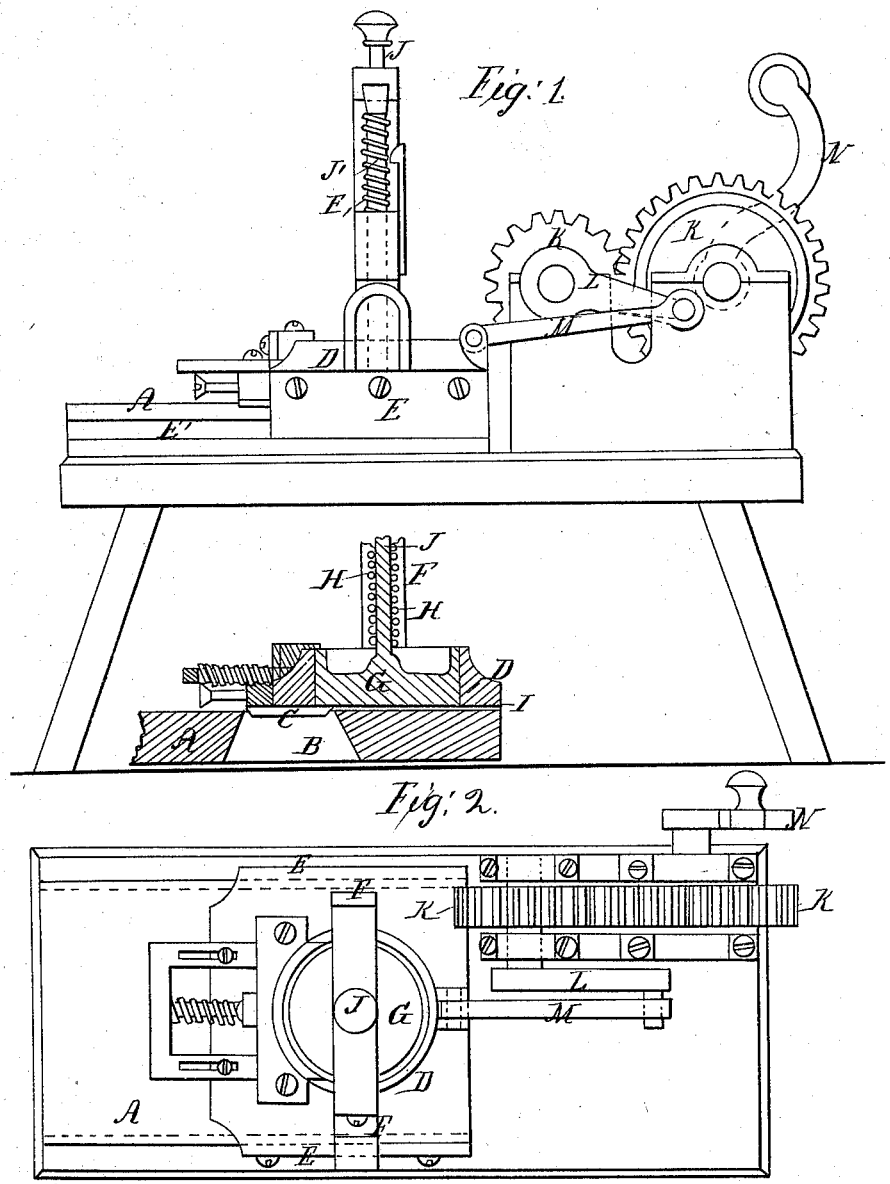

FRANCIS C. VIBERT, OF HOCKANUM, CONNECTICUT.

Letters Patent No. 97,462, dated November 30, 1869.

IMPROVED FRUIT-SLICER.

The Schedule referred to in these Letters Patent and making part of the same.

*To all whom it may concern:*

Be it known that I, FRANCIS C. VIBERT, of Hockanum, county of Hartford, and State of Connecticut, have invented certain new and useful Improvements in Device for Slicing Fruit; and to enable others skilled in the art to make and use the same, I will proceed to describe, by referring to the drawings, in which the same letters indicate like parts in each of the figures.

The nature of this invention consists of an oscillating frame-work and follower, in combination with a reciprocating fruit-holder, arranged to work upon a table or bed, in which is secured a cutter or cutters, and operated to and fro by means of a crank, with or without gearing.

In the accompanying drawings—

Figure 1 is a side elevation, partly in section.

Figure 2 is a top view.

A is a table or bed-plate, through which is formed an orifice, B, and across which is arranged and secured a double-edge cutter, C, which represents one or more in number.

D is a reciprocating fruit-holder, arranged upon the bed-plate A, and is held and guided in its relative position with the bed-plate and its cutters, by means of tongued guide-plates E, which work against the sides of the bed-plate, and in the grooves E'.

This holder is provided with an upright frame-work, F, in which is arranged a follower, G, actuated downward by a spring, H, so that, by lifting said follower, the fruit may be placed in the receptacle between the follower and the bed-plate or cutters.

This frame F is jointed at its lower end to the holder D, so that, by lifting the follower G, by its knob-spindle J, it may be turned over nearly a quarter turn in either direction, from a perpendicular position, for the purpose of inserting the fruit into a receptacle formed in the holder therefor. When it is again replaced in a perpendicular position upon the fruit, and held in that position by a spring-catch or bolt J J'.

K are gearing, appropriately arranged in boxes upon the bed-plate, and having a crank, L, arranged upon the end of one of the shafts; and a connecting-rod, M, from said crank to a joint formation on the fruit-holder.

Now, it will be seen that when the fruit is placed in the receptacle of the fruit-holder, and motion is imparted to the pulley or crank N, the fruit-holder, with the fruit therein, will be rapidly reciprocated back and forth over the cutters, and the slices of fruit thus cut will drop through the orifice into any proper receptacle placed therefor.

The crank L may be secured directly upon the driving-shaft, when desirable, and thus dispense with the gearing, except when a greater speed is required for the cutting operation.

In the manufacture of these machines, variation of form of construction, size, and shape, and of material may be had, without departing from the principle of its operation.

I do not therefore wish to be confined to this exact mode of construction.

I believe I have thus shown the nature, construction, and advantage of this invention, so as to enable others skilled in the art to make and use the same therefrom.

I claim the upright oscillating frame-work F, and follower G, in combination with a reciprocating fruit-holder D, operated by gearing K, crank L, connecting-rod M, and table A, with double-edge cutter C, constructed and arranged as herein described, and for the purpose set forth.

FRANCIS C. VIBERT. [L. S.]

Witnesses:
 E. W. BLISS,
 JEREMY W. BLISS.